(12) United States Patent
Sickinger et al.

(10) Patent No.: US 9,790,915 B2
(45) Date of Patent: Oct. 17, 2017

(54) TURBINE FOR A FLOW POWER PLANT

(71) Applicant: Voith Patent GmbH, Heidenheim (DE)

(72) Inventors: Christoph Sickinger, Heidenheim (DE); Patrick Hennes, Herbrechtingen (DE); Benjamin Scheunert, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 330 days.

(21) Appl. No.: 14/419,157

(22) PCT Filed: Jun. 11, 2014

(86) PCT No.: PCT/EP2014/062142
§ 371 (c)(1),
(2) Date: Feb. 2, 2015

(87) PCT Pub. No.: WO2015/014523
PCT Pub. Date: Feb. 5, 2015

(65) Prior Publication Data
US 2015/0337796 A1 Nov. 26, 2015

(30) Foreign Application Priority Data

Aug. 2, 2013 (DE) .................. 10 2013 012 844

(51) Int. Cl.
*F03B 3/06* (2006.01)
*F03B 15/06* (2006.01)
(Continued)

(52) U.S. Cl.
CPC .............. *F03B 15/06* (2013.01); *F03B 3/06* (2013.01); *F03B 13/264* (2013.01);
(Continued)

(58) Field of Classification Search
CPC .... F03D 1/0658; F03D 1/0691; F03D 1/0666; F03D 3/064; F03D 7/0224; F03B 17/061;
(Continued)

(56) References Cited

U.S. PATENT DOCUMENTS 2,801,068 A * 7/1957 Deriaz ................... F03B 3/145
416/157 R
4,021,142 A * 5/1977 Violette ................... F02K 3/06
416/160

(Continued)

FOREIGN PATENT DOCUMENTS

| CN | 103032266 | 4/2015 |
|---|---|---|
| DE | 868954 | 3/1953 |

(Continued)

*Primary Examiner* — Matthew W Jellett
(74) *Attorney, Agent, or Firm* — Farjami & Farjami LLP

(57) ABSTRACT

There is provided a turbine including a hub body including a shaft for transmitting the torque generated by the turbine to a driven machine, a plurality of turbine blades carried by the hub body and rotatable about their longitudinal axes, an adjusting body in an interior of the hub body, arranged as a spherical link chain extending coaxially to the shaft and rotatable about a shaft axis of the shaft, and a guide rod chain for each of the plurality of turbine blades, including a smooth spherical shell having a uniform surface and two guide rods, including a first guide rod having a first end linked to the adjusting body via a swivel joint and a second guide rod having a first end linked to a second end of the first guide rod via the swivel joint.

9 Claims, 4 Drawing Sheets

(51) Int. Cl.
*F03D 7/02* (2006.01)
*F03B 13/26* (2006.01)
*F03B 17/06* (2006.01)
*F03D 1/06* (2006.01)

(52) U.S. Cl.
CPC .......... *F03B 17/061* (2013.01); *F03D 1/0666* (2013.01); *F03D 7/0224* (2013.01); F05B 2210/16 (2013.01); F05B 2250/411 (2013.01); F05B 2260/79 (2013.01); *Y02E 10/28* (2013.01); *Y02E 10/721* (2013.01)

(58) Field of Classification Search
CPC ........ F03B 15/06; F03B 3/06; F05B 2260/71; F05B 2260/74; F05B 2260/79; Y02E 10/223; Y02E 10/28; Y02E 10/721; Y02E 10/722; F04D 29/364
USPC .................................. 416/53, 141, 163, 500
See application file for complete search history.

(56) References Cited

U.S. PATENT DOCUMENTS

| | | | | |
|---|---|---|---|---|
| 4,029,434 A | * | 6/1977 | Kenney | B64C 11/06 416/136 |
| 4,124,330 A | * | 11/1978 | Barnes | B64C 11/30 416/157 B |
| 5,145,321 A | * | 9/1992 | Flux | B64C 27/35 416/134 A |
| 5,599,168 A | * | 2/1997 | Lund | F03D 7/0236 416/135 |
| 8,109,728 B2 | | 2/2012 | Neitzke | |
| 8,360,721 B2 | * | 1/2013 | Podgurski | B64C 27/35 416/1 |
| 8,708,654 B2 | * | 4/2014 | Ramsland | F03D 1/0658 416/140 |
| 9,194,366 B2 | * | 11/2015 | Ramsland | F03D 1/0691 |
| 9,410,531 B2 | * | 8/2016 | Hayashi | F03D 7/0224 |
| 2009/0297348 A1 | | 12/2009 | Neitzke | |
| 2015/0252785 A1 | * | 9/2015 | Klein Meuleman | F03D 1/0658 416/148 |

FOREIGN PATENT DOCUMENTS

| | | |
|---|---|---|
| DE | 1043572 | 11/1958 |
| DE | 1294588 | 1/1966 |
| DE | 102012025127 | 6/2014 |
| DE | 102013001212 | 7/2014 |
| JP | 60162073 | 10/1985 |

* cited by examiner

TURBINE FOR A FLOW POWER PLANT

This is a U.S. national phase application, which is based on, and claims priority from, PCT application Serial No. PCT/EP2014/062142, filed Jun. 11, 2014, which claims priority from foreign application Serial No. 10 2013 012 844.7, filed Aug. 2, 2013, in Germany.

The invention relates to the field of flow power plants. It relates in particular to underwater flow power plants, but also to wind power plants. Flow power plants comprise a water turbine, a generator in drive connection with said turbine, and a support construction standing on the ground of the water body as the most essential components. Such flow power plants are used in any kind of flowing water bodies such as rivers, but especially in the sea. The energy of tidal flows is utilised for example.

The turbine and the generator are situated in a torpedo-shaped housing (see DE 10 2013 001 212 and DE 10 212 025 127). The turbine, the generator and the housing form the so-called nacelle. U.S. Pat. No. 8,109,728 B2 describes a turbine with a hub body which carries a plurality of turbine blades, an adjusting body arranged in the hub body, and a guide rod chain for each blade.

The turbine comprises a hub body which carries a plurality of turbine blades. This frequently concerns three turbine blades. They are adjustable about their longitudinal axis, about 180° if possible. The rotating occurs for adjustment to operating conditions, especially to the direction and the power of the incoming flow.

The devices for the adjustment of the blades are numerous. Complex sprocket mechanisms are frequently used. They must be sealed against the ambient environment. Sealing must be highly reliable in the case of maritime underwater flow power plants. This leads to expensive solutions. Continuous maintenance is necessary. Since the rotating or adjusting devices are encapsulated in a sealed fashion, such work usually very laborious.

The invention is based on the object of providing a turbine according to the preamble of claim 1, and especially its rotating apparatus, in such a way that it has a simple configuration, it need not be sealed or encapsulated against the surrounding medium but can be exposed to the medium, and the pitch angle of the blade can be adjusted reliably and with high reproducibility.

This object is achieved by a turbine with the features of claim 1.

Accordingly, the fundamental idea of the invention contains the use of a rotating apparatus. It is enclosed by the hub body. It concerns a so-called spherical link chain. A shaft is connected to the hub body, which shaft transmits torque generated by the turbine to a driven machine. Two guide rods are connected to the rotating apparatus per blade. The guide rods transmit a rotating moment from the rotating apparatus to the respective blade.

The spherical link chain in accordance with the invention offers the following advantages:

- a simple construction which can be produced at low cost and is easy to maintain;
- the components of the rotating apparatus can be exposed to the medium (water, seawater) and thus lubricated simultaneously;
- the weight of the turbine is reduced;
- brief loading peaks which contribute little to power generation can be avoided;
- loads in general are limited, both the static ones and those that contribute to fatigue of the components;
- specific rotating positions of the blades can be set rapidly, e.g. braking and parking, rotating of the blades to the so-called vane position, thus securing the turbine;
- the pitch angle is set actively and can therefore assume a braking function, so that a special braking system can be avoided and the production costs can be reduced;
- a high degree of sturdiness by a few simple components.

The following conditions prevail in the concrete embodiments:

- all rotational axes of the joints intersect in a common point;
- there are no translatory degrees of freedom of the joints;
- all link points move on concentric spheres;
- the rotational axes of the joints of the blades intersect in one point of the rotational axis;
- the rotational axis of the joint of the rotating apparatus also faces the rotational axis of the hub body;
- the rotational axes of all guide rods also face the rotational axis of the hub body.

The link points of the guide rods are arranged as water-resistant swivel joints. The link chain can thus be operated in a flooded fashion. The link points and the lever conditions are arranged in such a way that rotating of at least 180° can be set at the output of the link chain. The joints and levers do not collide with each other during adjustment.

The invention is explained in closer detail by reference to the drawings in 3D, wherein.

Figure 1:
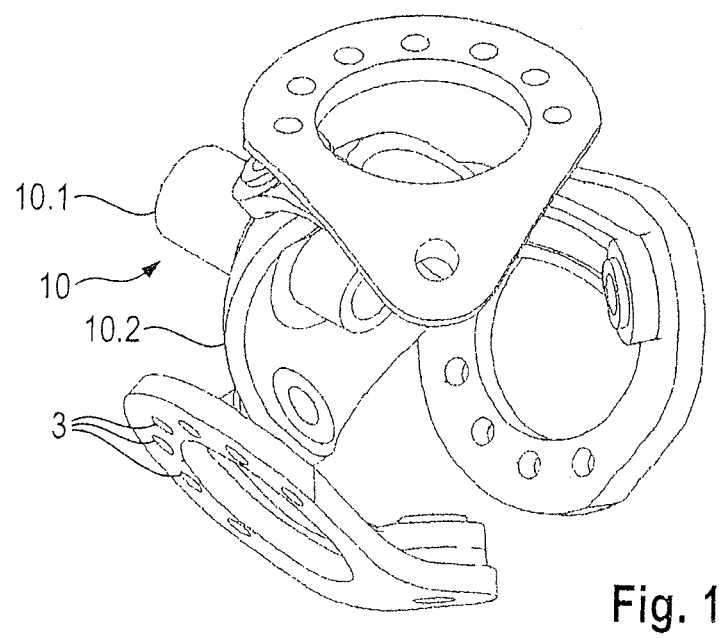
FIG. 1 shows the rotating apparatus with three link chains.

FIG. 1 shows the most important parts for adjusting the blades of a turbine (not shown). The central component is an adjusting body 10. The adjusting body 10 substantially has the shape of a cup. It comprises a drive pin 10.1 and a spherical shell 10.2.

Figure 2:
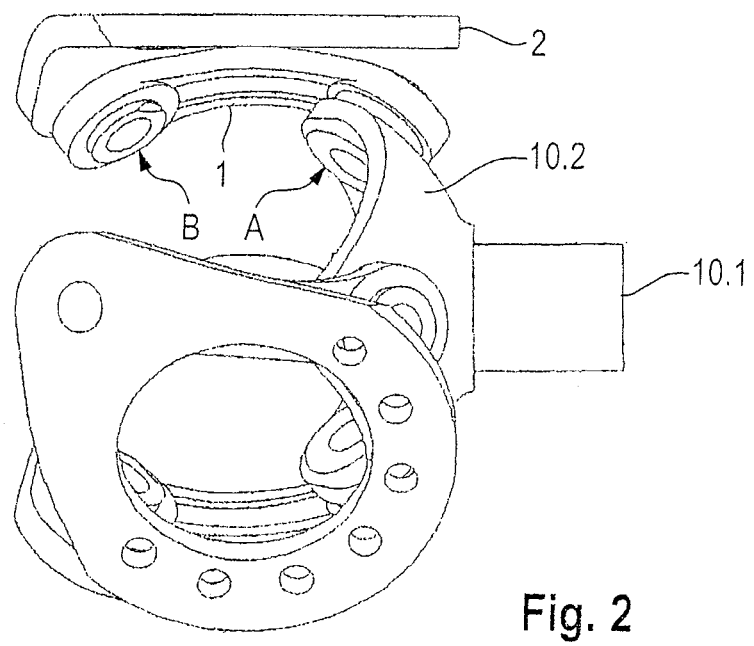
FIG. 2 shows the subject matter of FIG. 1 in a second view.
Figure 3:
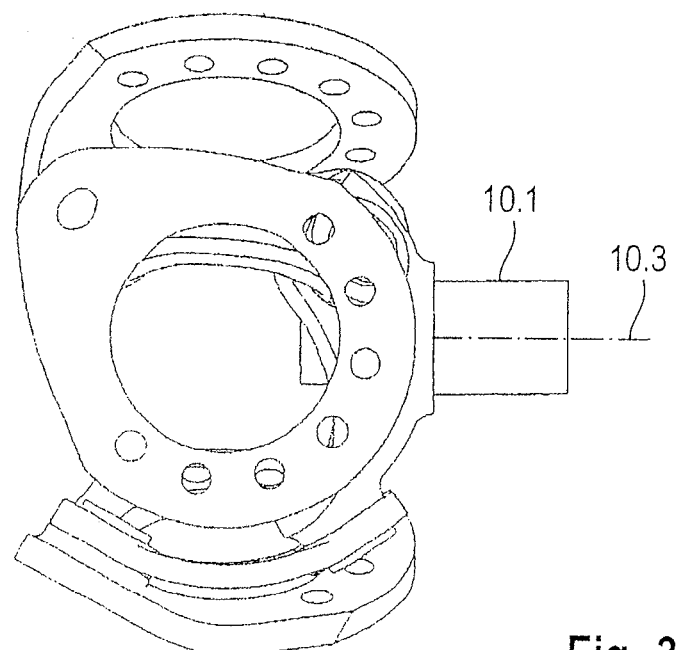
FIG. 3 shows the subject matter of FIG. 1 in a third view.

Three guide rod chains are connected to the spherical shell 10.2. They are completely identical in the present case. Deviations from this are also possible however. Each guide rod chain comprises two guide rods. The configuration of the three guide rod chains will be explained by reference to one of these guide rod chains with guide rods 1 and 2. FIG. 2 shows that the guide rod 1 comprises two swivel joints, namely a first swivel joint A and a second swivel joint B. Swivel joint A produces an articulated connection between the adjusting body 10 and the first end of the first guide rod 1. The first guide rod 1 could also be referred to as "articulated lever".

Swivel joint B is situated at the second end of the articulated lever 1 and represents an articulated connection to the second guide rod. Said second guide rod 2 could also be referred to as blade connection guide rod.

The second end of the blade connection guide rod 2 has the shape of a circular ring. The circular ring comprises boreholes 3 for guiding screws through said boreholes, by means of which the blade (not shown) is fixed to the blade connection guide rod 2. The second end of the blade connection guide rod 2, which is shaped as a circular ring, is embedded in a hub body 11, which will be described below in closer detail.

Figure 4:
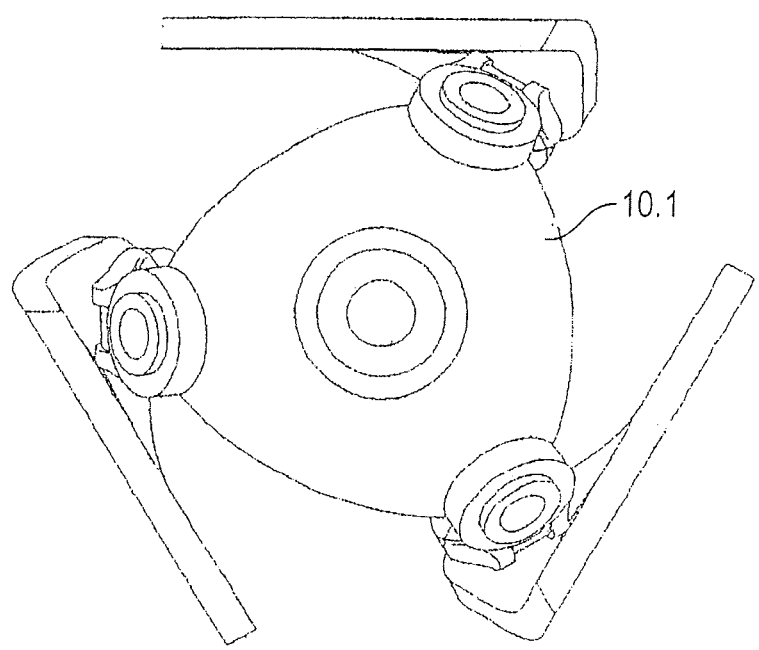
FIG. 4 shows the subject matter of FIG. 1 in a top view in the direction towards the rotating axis of the rotating apparatus.
Figure 5:
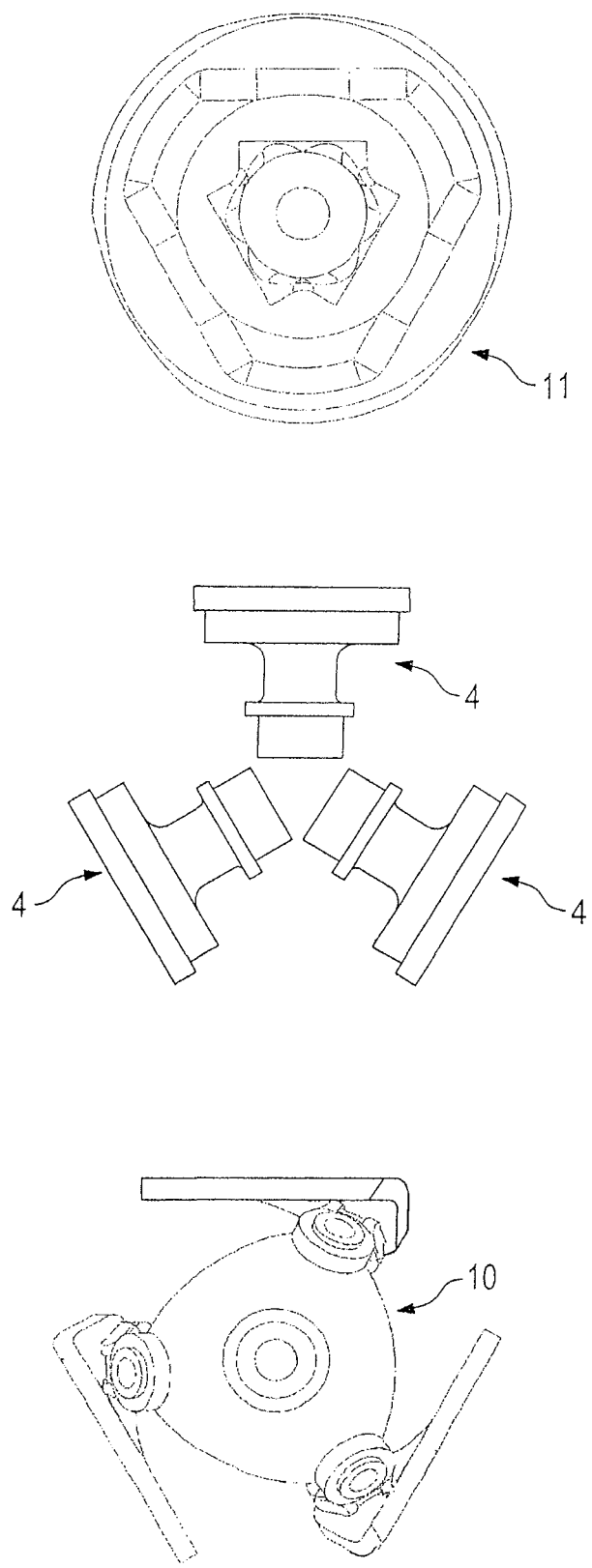
FIG. 5 shows the individual components of a turbine blade bearing.

FIG. 4 shows a view of the adjusting body 10 in the direction of its rotating axis.

FIGS. 5 to 8 also show a hub body 11 in addition to the adjusting body, the three guide rod chains, and the blade connections 4.

Figure 6:
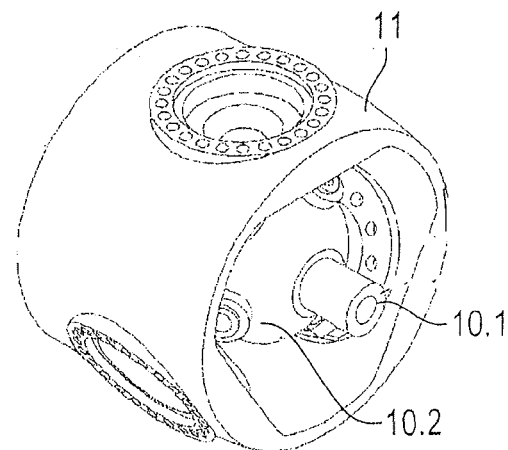
FIG. 6 shows a rotating apparatus, installed in a hub body, in a first view.
Figure 7:
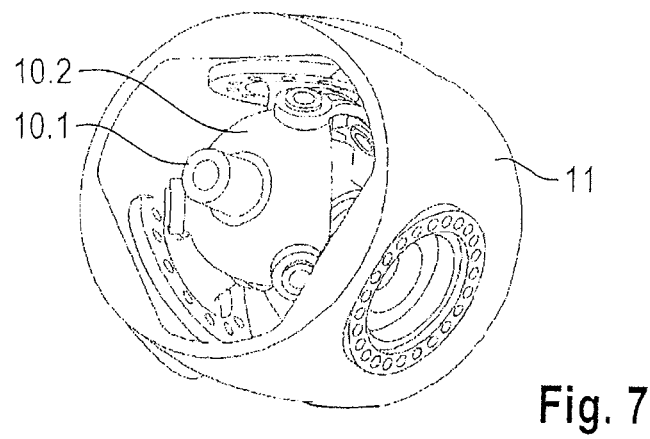
FIG. 7 shows the subject matter of FIG. 6 on an enlarged scale in a second view.
Figure 8:
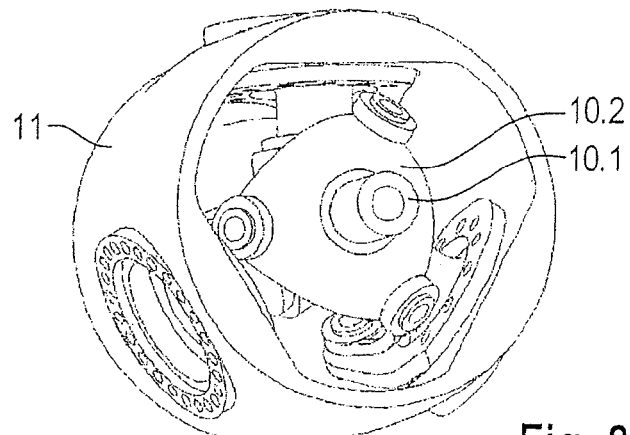
FIG. 8 shows the subject matter of FIG. 6 on an enlarged scale again and in a third view.

FIGS. 6, 7 and 8 show clearly how the adjusting body 10 and the three guide rod chains are installed in the hub body 11. The respective second end of the second end, i.e. the so-called blade connection guide rod, is shown in particular (see the circular ring shape with the boreholes for the fastening screws for fastening the three blades).

FIG. 2 shows in particular that the guide rod 1 with the swivel joints A and B is curved in the side view. It has the same radius of curvature as the spherical shell 10.2 of the adjusting body 10. This obviously applies to all three guide rod chains. The first guide rod 1 or articulated lever is curved in a spherical manner.

The hub body 11 is driven during operation of the turbine. The torque generated by the turbine is transmitted via a shaft (not shown) to a power engine, e.g. a generator. The adjusting body 10 can be rotated about the rotating axis of the drive pin 10.1, even during operation. The rotating also simultaneously rotates all blades by the guide rod chains, e.g. by 180° or more.

LIST OF REFERENCE NUMERALS

1 Guide rod
2 Guide rod
3 Boreholes
4 Blade connection
10 Adjusting body
10.1 Drive pin
10.2 Spherical shell
10.3 Rotating axis
11 Hub body
A Swivel joint
B Swivel joint

The invention claimed is:

1. A turbine comprising:
  a hub body including a shaft for transmitting the torque generated by the turbine to a driven machine;
  a plurality of turbine blades carried by the hub body and rotatable about their longitudinal axes;
  an adjusting body in an interior of the hub body, arranged as a spherical link chain extending coaxially to the shaft and rotatable about a shaft axis of the shaft; and
  a guide rod chain for each of the plurality of turbine blades, comprising two guide rods, including a first guide rod having a first end linked to the adjusting body via a swivel joint and a second guide rod having a first end linked to a second end of the first guide rod via the swivel joint, and the first guide rod and the second guide each including a second end rotatably mounted on the hub body about the longitudinal axis of the respective blade;
  wherein the adjusting body comprises a drive pin and a smooth spherical shell having a uniform surface, and wherein at least the first guide rod is spherically shaped from a side view perspective.

2. The turbine according to claim 1, wherein at least the first guide rod is arranged in the spherical shell.

3. The turbine according to claim 1, wherein the second end of the second guide rod is annular, embedded in the hub body and also performs twisting during twisting of the adjusting body in order to twist the respective blade.

4. The turbine according to claim 2, wherein the second end of the second guide rod is annular, embedded in the hub body and also performs twisting during twisting of the adjusting body in order to twist the respective blade.

5. The turbine according to claim 1, wherein the turbine is a component of a wind power plant or a hydroelectric power plant.

6. The turbine according to claim 2, wherein the turbine is a component of a wind power plant or a hydroelectric power plant.

7. The turbine according to claim 3, wherein the turbine is a component of a wind power plant or a hydroelectric power plant.

8. The turbine according to claim 4, wherein the turbine is a component of a wind power plant or a hydroelectric power plant.

9. The turbine according to claim 1, wherein the turbine is a component of a flow power plant.

* * * * *